Nov. 24, 1959  F. W. WINK  2,914,305
LIGHTWEIGHT PORTABLE DIAMOND DRILL
Filed Sept. 28, 1956  3 Sheets-Sheet 1

INVENTOR
FREDRICK W. WINK

BY
*Young and Wright*
ATTORNEYS

Nov. 24, 1959 F. W. WINK 2,914,305
LIGHTWEIGHT PORTABLE DIAMOND DRILL
Filed Sept. 28, 1956 3 Sheets-Sheet 2

INVENTOR
FREDRICK W. WINK

BY Young and Wright
ATTORNEYS

Nov. 24, 1959    F. W. WINK    2,914,305
LIGHTWEIGHT PORTABLE DIAMOND DRILL
Filed Sept. 28, 1956    3 Sheets-Sheet 3
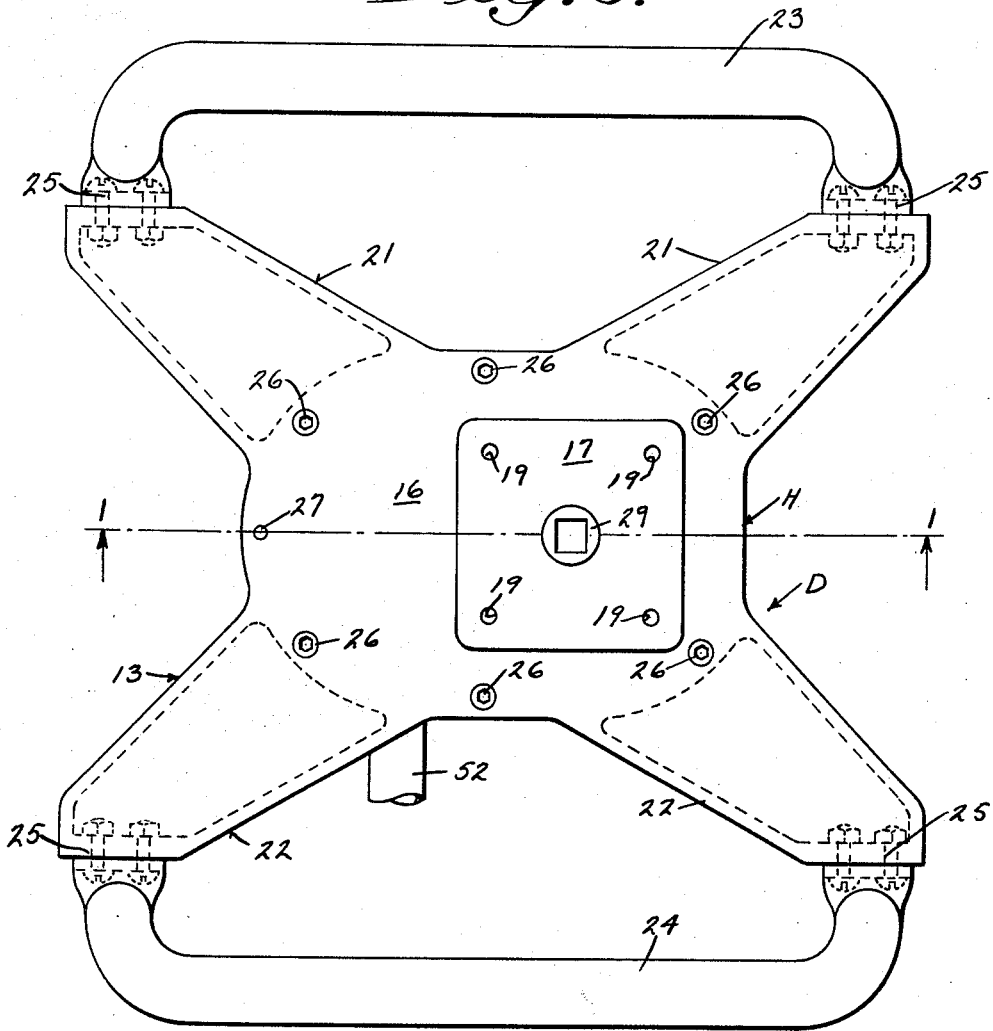
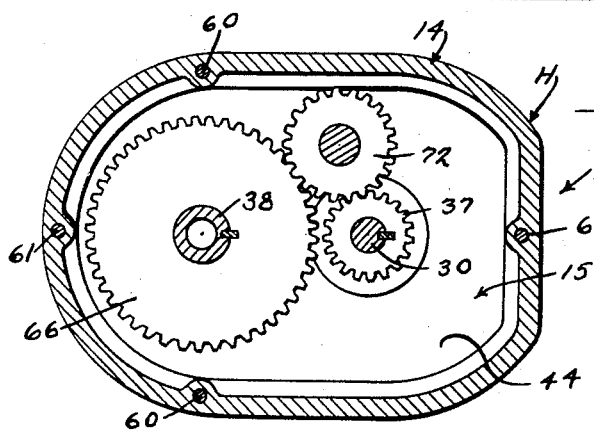
INVENTOR
FREDRICK W. WINK
BY
*Young and Wright*
ATTORNEYS

United States Patent Office 2,914,305
Patented Nov. 24, 1959

2,914,305

LIGHTWEIGHT PORTABLE DIAMOND DRILL

Fredrick W. Wink, Milwaukee, Wis., assignor to Bucyrus-Erie Company, South Milwaukee, Wis., a corporation of Delaware Application September 28, 1956, Serial No. 612,612

3 Claims. (Cl. 255—19)

This invention appertains to an improved earth drill and, more particularly, to a lightweight portable high speed drill for drilling exploration holes and the like, taking core samples, and is particularly adapted to drilling through hard rock.

Heretofore, in areas particularly where exploration is desired and where core samples are to be taken, heavy drills of the type utilized for the actual drilling of the hole have been used. In rough and difficult terrain, it has been found necessary to pack the heavy drills now on the market in separate pieces, usually employing the services of four or five men, merely to carry the drill to its destination. Then, of course, the drill must be reassembled before it can be used. While some attempts have been made to utilize drills of a light portable nature for taking these core samples, all known prior devices will operate only a few feet below the surface and are, in themselves, complicated and almost as costly as the heavier drills now in use.

Therefore, it is a primary object of my present invention to provide a portable lightweight, easily handled drill of the type driven by either an internal combustion or electric motor and which will drill in any position, upwardly, downwardly, or laterally.

Another important object of my present invention is to provide a lightweight portable drill having all of the advantages of the larger drills now on the market and which can drill to a considerable depth, take large core samples and which far out-performs all other known types of so-called "portable" sample testers.

In drilling through rock, the most commonly used "bit" consists of a matrix or form in which there are set a plurality of cutting diamonds which serve as cutting and abrading edges to wear away the rock as the drill is rotated. In order to drill satisfactorily with diamond drills, it is necessary to provide a continuous stream of water in the drilling "bit" and to this end it has been customary to use a hollow drill rod and drill spindle through which water is forced to the bit while it is being rotated. Further, when core samples are to be taken, hollow core barrels are used and secured to the hollow drill spindle by an adaptor or the like.

The water supply to the hollow drill spindle is normally made through a rotatable connection which is attached to the upper end of the drill rod, core barrel, or adaptor as the case may be. In drilling deep holes, particularly in close quarters, it is necessary to use a drill rod or core barrel composed of many sections, each of the sections being from 20 to 60 inches long, depending upon the work space available and it has been customary to use a hollow spindle connected to the drilling section and adding each new section to the preceding section as the drilling advances until finally the desired hole depth is obtained. As explained above, the water connection is at the upper end and hence, in order to add each new section to the drill rod, it has been necessary to disconnect the water swivel and add the additional section and finally again reconnect the water swivel for further drilling operation. Obviously, much time and labor is consumed in this non-productive operation.

Therefore, a salient feature of my invention resides in providing a water inlet in my novel casing or housing leading directly to the top of the hollow drill spindle.

A further object is to provide the water connection in the casing at the top of the hollow spindle and to seal the same completely from the gears and other working parts of the drill.

Still another object of my invention is to provide a centrifical clutch between the motor and the drill spindle so that the motor may run and idle without turning the spindle, thus, providing a safety feature not found in other portable drills.

A further important object of my invention is to provide a novel casing or housing for the clutch, gears, drive mechanism and hollow spindle which is compact and easily assembled.

A more specific object is to form my novel casing in three simple castings, a top cover casting forming the base and support for the motor and having novel means for mounting the handles thereon and housing the clutch; a center section supporting the drive from the clutch, the upper portion of the spindle and the gear reduction drive; and a lower bottom section effectively sealing the above mentioned parts and providing a lower bearing for the hollow drill spindle.

Another object resides in the novel means for mounting and arranging the handles so that the drill may be easily carried and operated as desired.

A further object of my invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts hereinafter more specifically described, illustrated and claimed.

A preferred and practical embodiment of my invention is shown in the accompanying drawings, in which.

Figure 1:
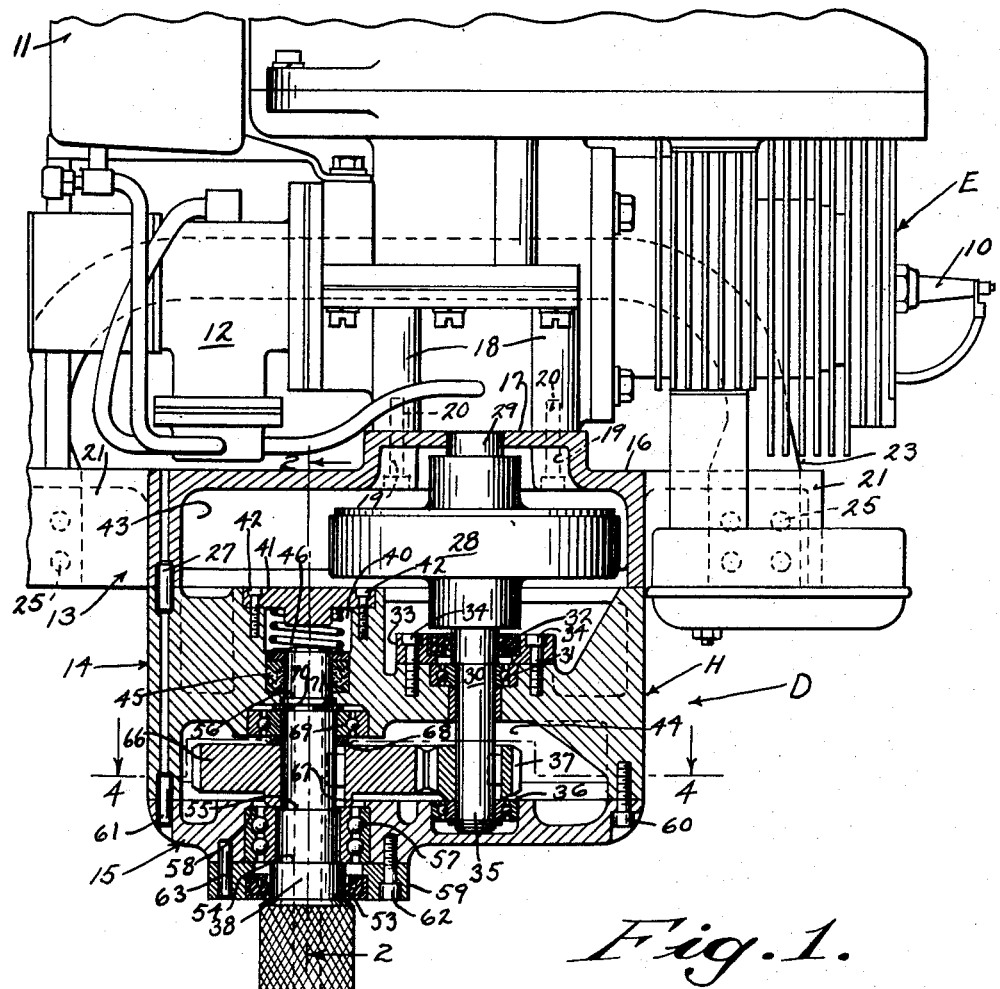
Figure 1 is a fragmentary side elevational view partly in section of my novel lightweight portable drill showing, particularly in section, details in the construction of my novel casing and means for taking a core sample, the section being represented by the line 1—1 of Figure 3 and looking in the direction of the arrows.
Figure 1:
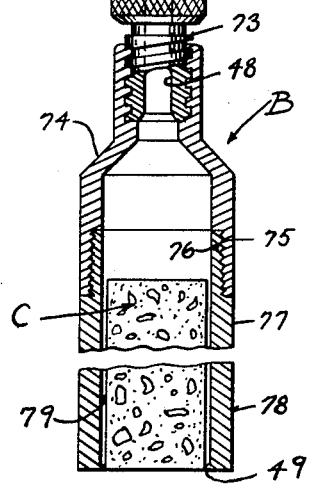

Figure 3 is a top plan view of my novel lightweight portable drilling machine with the drive means, i.e. the internal combustion engine removed showing the novel structure of my top cover casting forming a base and support for the source of power and handle arrangement, and Figure 4 is a horizontal sectional view through my novel casing, the view being taken on the line 4—4 of Figure 1 of the drawings and looking in the direction of the arrows.

Referring now to the drawings in detail wherein similar reference characters designate corresponding parts throughout the several views, the letter D generally indicates one type of my improved portable drill and the same includes, broadly, a source of power, such as an internal combustion engine E, my novel casing or housing H and the core barrel assembly B for taking a core sample C.

As previously stated, my drill may be driven by any type of motor but for the purpose of description, I have shown a conventional internal combustion engine E and inasmuch as this is a conventional engine, it need not be described in detail but the same is of a one cylinder type fired by the single spark plug 10. The engine E is, of course, provided with the usual fuel supply tank 11 and means 12 for carbureting and feeding the fuel to the cylinder.

This internal combustion engine E is mounted on the top cover section 13 of my novel gear casing or housing H and the housing H comprises three separate castings, the afore-mentioned top cover casting 13, a center section 14 and a lower bottom section 15. Obviously, the engine may be secured to the base or support portion 16 of the top cover section 13 by any desired means but I have provided a re-enforced raised platform 17 to which the four posts 18 of the motor frame is secured. I provide four apertures 19 in the raised platform 17 through which extends the bolts 20 to secure the posts in place. Extending diagonally from the base or support 16 are pairs of arms 21 and 22 and these arms form supports for securing the side handles or rails 23 and 24. The handles are preferably of the tubing type and are firmly bolted at 25 to each arm. Thus it can be seen that the drill may be easily operated and directed by grasping the handles 23 and 24. The engine E is neatly secured between the handles and presents no obstacle in the manipulation of the drill.

My cover section 13 is secured to the center section 14 by means of suitable machine screws 26 and, if desired, I may also utilize at various points, guide dowels 27 as shown. The cover section 13 also provides room for housing a centrifugal clutch 28 of any well-known type now on the market and this clutch includes the drive shaft 29 and the driven shaft 30. The drive shaft 29 is driven, in turn, by the internal combustion engine E or, as previously stated, by an electric motor if such be the case. The driven shaft 30 extends through a bearing 31 in the center section 14 and a suitable seal 32 such as the one carried by the collar 33, may be provided to properly seal the bearing from the entrance of foreign matter. The collar 33 is firmly secured in place by the use of machine screws 34. The lower end 35 of the driven shaft 30 is received in a bearing 36 carried by the bottom section 15 and just above this bearing and splined to the driven shaft 30 is a drive gear 37.

Extending through sections 15 and into section 14 is the hollow spindle 38, the upper end of which is in open communication with a chamber 40 formed in the section 14. This chamber 40 is closed at its upper end by a plug 41 and the plugs securely fastened by machine screws 42. Obviously, if desired, the plug may be provided with a suitable gasket or the like to seal the chamber 40 at its upper end from the enlarged chamber 43 formed by the top cover section 13. In order to seal the lower end of this chamber 40 and to prevent leakage to the various bearings and into the enlarged compartment 44 formed by the center section 14 and the bottom section 15, I provide suitable packing or seals 45. Due to the fact that the upper portion 39 of the spindle 38 rotates within the packing or seals 45, some means must be provided to firmly hold the seals in place and to urge the seals in close contact with the spindle. For this purpose, I employ a coil spring 46 which exerts tension between the plug 41 and the upper surface of the seals 45. The lower end of the packing or seals 45 rests on the bottom of the chamber 40, as shown.

A salient feature of my invention resides in the fact that water is fed to the upper end of the hollow spindle 38 through the bore 48 of the spindle and into the core barrel assembly B for the purpose of lubricating the diamond bit 49 and flushing away cuttings from the core sample C. In order to do this, I eliminate any necessity of providing swivel connections and the like to the core barrel assembly B and I merely provide a laterally projecting bore 50 in the section 14 which communicates with the interior of the chamber 40 and extends to the outside of the center section 14. This bore 50 may be internally threaded at 51 to receive the end of an ordinary garden hose 52 and, as is obvious, water may flow from the hose 52 through the port 50 into the chamber 40 and down through the hollow bore 48 of the spindle 38.

Figure 2:
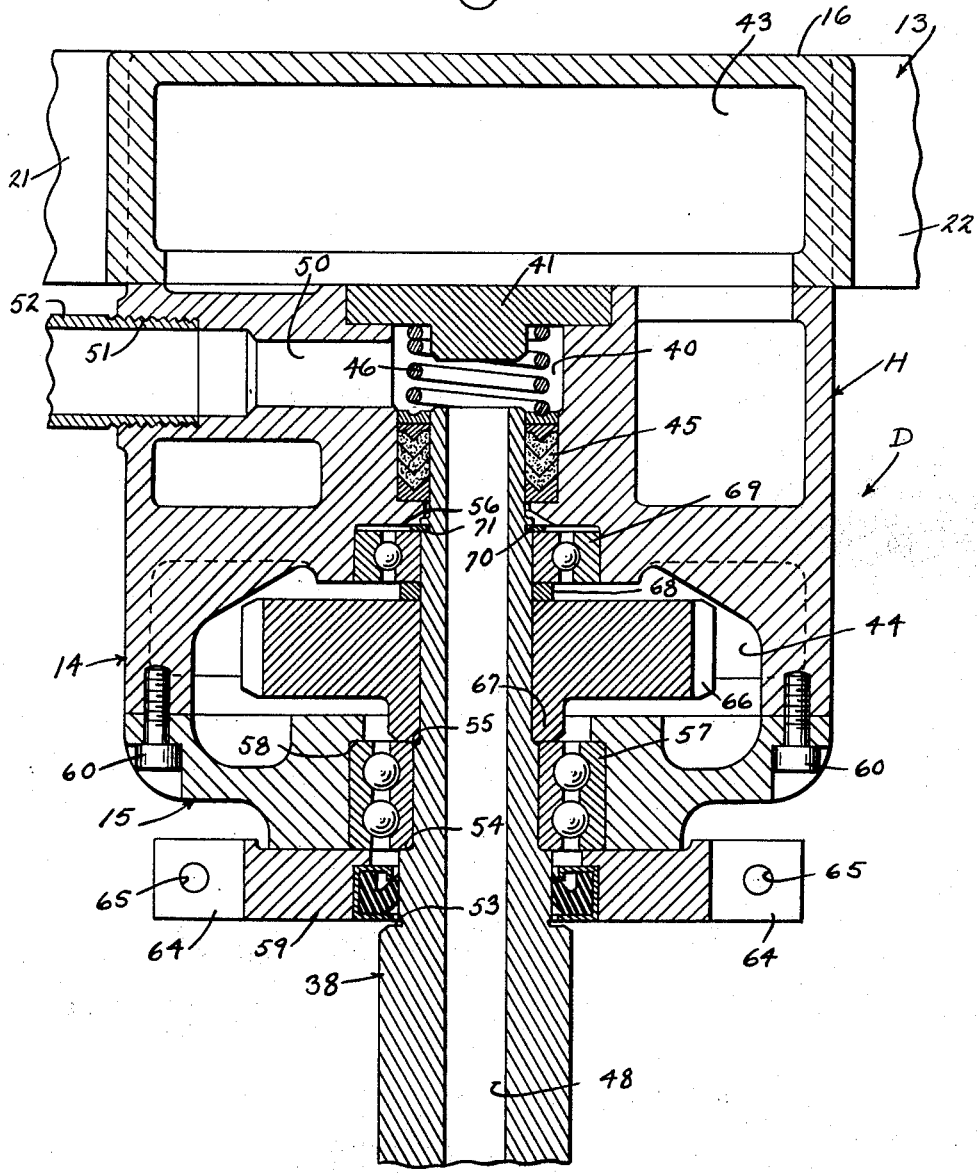
Figure 2 is an enlarged fragmentary transverse section through my novel casing or housing illustrating clearly the means for inducing water to the casing and the top of the hollow spindle, the section being taken on the line 2—2 of Figure 1 of the drawings and looking in the direction of the arrows.

In order to rotatably mount the hollow spindle 38 securely in my novel housing H, it should be noted that the upper section of the spindle is formed with a series of reduced portions forming the shoulders 53, 54, 55 and 56. Resting on the shoulder 54 and received in the bottom section 15 is a thrust bearing 57 and this bearing is secured against movement by resting on the shoulder 58 provided in the section 15 and against the upper surface of a collar 59 (note Figures 1 and 2). It should also be noted that the bottom section 15 is secured to the center section 14 by a series of machine screws 60 and I may also utilize, if desired, one or more dowels 61. The collar is likewise secured to the lower end of the section 15 by the machine screws 62 and I may again employ a dowel or the like 63.

It should be further noted that the collar 59 (Figure 2) is provided with a pair of projecting ears 64 having suitable apertures 65 to receive the chain links and bolts of a force applying attachment which is more fully described in my prior application, S.N. 516,870, filed June 21, 1955, now Patent No. 2,842,341, and entitled Force Applying Attachment for Portable Power Drills.

Keyed or otherwise splined to the spindle 38 adjacent to the thrust bearing 57 is a relatively large driven gear 66 and this gear has a projection 67 which rests on the shoulder 55 of the spindle 38 and also this projection 67 rests on the upper surface of the thrust bearing 57. Above this gear is a spacer washer 68 and another bearing 69 on the upper surface of which is a lock washer 70 or the like which is, in turn, received in a groove 71 formed in the hollow spindle 38 below and adjacent the shoulder 56 thereof. Thus, it can be seen that the hollow spindle 38 is firmly held from any shifting movement within the housing H but may be readily rotated when the gear 66 is driven.

Referring now more particularly to Figure 4 of the drawings, it should be noted that the gear ratio for driving the hollow spindle 38 is preferably 3–1 and this is obtained by providing an idler gear 72 in the space 44 between the drive gear 37 and the driven gear 66. Thus, when the internal combustion engine E is started, drive shaft 29 will rotate and as the drive is speeded up, the centrifugal clutch 28 will engage and drive the driven shaft 30. This driven shaft, in turn, drives the drive gear 37 and imparts motion to the driven gear 66 through the idler gear 72 and the hollow spindle 38 will be rotated.

The lower end of the hollow spindle 38 is externally threaded at 73 to receive either a drill rod or, as shown, a core barrel adaptor 74 and this adaptor may be provided in various sizes and shapes depending upon the dimension of core sample C desired. In any event, the core adaptor is also provided with lower internal threads 75 which receives the externally threaded reduced portion 76 of a core barrel section 77. Although not shown, the lower end of the core barrel section 77 is internally threaded similar to the threads 75 of the core barrel adaptor 74 to receive another externally threaded section of additional core barrel sections. The lower section, however, is the drill bit section 78, the lower end of which is provided with a diamond bit 49, as shown, which is utilized for cutting away the rock and other surface to cause the core sample C to move up within the bit section 78 and core barrel section 77.

As previously mentioned, water is continually circulated in the space 79 between the inner surfaces of the various sections and the outer surfaces of the core sample C so that all cuttings will be washed away and the diamond bit 49 will be properly lubricated.

In utilizing my novel lightweight portable drill, it is merely necessary to grasp the handles and as the drill is extremely light, weighing between 37 and 50 lbs., it can be easily manipulated by one person. In actual practice, I utilize some sort of force applying attachment and as previously mentioned, I preferably utilize the force applying attachment more fully described in my above mentioned prior application. Thus, in drilling into the ground, the operator has one hand on each hand rail and places a foot on the bar of the force applying attachment and the internal combustion engine is speeded up to rotate the drill bit 49 as described. As the hole proceeds, core barrel sections 77 are added as needed and this drill does the sample taking job of 600 lb. type drills and has additional advantages in that besides being light, the engine may idle without turning the drill; water is continually fed through the hollow spindle within the casing and a simple garden hose may be used for this purpose. The drill also takes any dimension of core barrels and drill rods, can easily drill to more than 125 feet and take large core samples.

Thus, it can be seen that I have provided a light portable drill which is easily handled and manipulated by one man and may be carried from place to place over difficult terrain and can drill or take core samples either vertically, laterally and even drilling straight up.

A further important advantage also resides in providing a direct drive from the motor or engine to the spindle. In other words, the shafts 29, 30 and the hollow spindle 38 are all in a vertical plane driven through suitable gears and no laterally extending, horizontal, or off-set shafts are utilized or needed.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the appended claims.

I claim:

1. In a portable diamond drill for taking core samples and the like, a compact casing, a centrifugal clutch and gear reduction mechanism operatively interconnected and received in said casing, a drive motor including a drive shaft operatively connected to said clutch, said motor being mounted on top of said casing and said casing including, a top cover section forming a support for the drive motor and chamber for said clutch, a center section having a fluid chamber and a bottom cover section, means for securing said sections together to form a unitary casing, a gear chamber in said casing for said reduction gears, a hollow drill spindle rotatably carried by said casing and operatively connected to said reduction gears; said spindle extending in one direction into said fluid chamber and projecting outwardly from said bottom section in the other direction, said drive shaft, clutch shaft and spindle lying in a parallel relation to each other, an axial passageway in said spindle communicating with said fluid chamber, a drill bit operatively connected to said spindle, said bit having an axial passageway in communication with the passageway of said spindle, and port means in said fluid chamber whereby fluid may flow into said chamber and thence through said spindle and drill bit.

2. In a portable diamond drill for taking core samples and the like, a compact casing; a centrifugal clutch and gear reduction mechanism operatively interconnected and received in said casing; a drive motor including a drive shaft operatively connected to said clutch; said motor being mounted on top of said casing; and said casing including: a top cover section forming a support for the drive motor and chamber for said clutch, a center section having a fluid chamber, and a bottom cover section; means for securing said sections together to form a unitary casing; a gear chamber in said casing for said reduction gears; a hollow drill spindle rotatably carried by said casing and operatively connected to said reduction gears; said spindle extending in one direction into said fluid chamber and projecting outwardly from said bottom section in the other direction; said drive shaft, clutch shaft and spindle lying in parallel relation to each other; an axial passageway in said spindle communicating with said fluid chamber, a drill bit operatively connected to said spindle, said bit having an axial passageway in communication with the passageway of said spindle; port means in said fluid chamber whereby fluid may flow into said chamber and thence through said spindle and drill bit; and the longitudinal axis of said spindle approximately intersecting the center of gravity of the drill.

3. A portable rotary drill comprising; a central casing; an internal combustion engine mounted on one end of said casing; a clutch chamber within said casing; a centrifugal clutch connected to and driven by said engine and disposed within said clutch chamber; a gear chamber within said casing adjacent said clutch chamber; power transmission gear means rotatably mounted in said gear chamber and connected to and driven by said clutch; a fluid chamber within said casing adjacent said gear chamber; a wall in said casing being common to both the fluid and the gear chambers; a drill spindle connected to and driven by said gear means; an aperture in said common wall; said spindle projecting through said aperture into said fluid chamber in one direction and projecting outwardly from said casing in the other direction; an axial passageway in said drill spindle in communication with said fluid chamber; bearing means mounted in said casing and rotatably supporting said drill spindle; a drill bit having a cutting edge at one end and a shank at the other connected to and driven by said spindle; an axial passageway in said bit in communication with the passageway in said spindle and extending to said cutting edge; seal means adjacent said aperture to prevent fluid leakage between said fluid chamber and said gear chamber; port means in the fluid chamber for introducing fluid into said chamber whereby fluid may be directed through said spindle and bit to the cutting edge of said bit; the longitudinal axis of said spindle being disposed substantially coincident with the center of gravity of the drill; and guide means extending from at least two sides of said casing substantially equidistant from the longitudinal axis of said spindle.

References Cited in the file of this patent

UNITED STATES PATENTS

| | | |
|---|---|---|
| 1,216,047 | Backscheider | Feb. 13, 1917 |
| 1,869,875 | Warren | Aug. 2, 1932 |
| 2,229,791 | McWhirter | Nov. 5, 1940 |
| 2,250,670 | Joy | July 29, 1941 |
| 2,598,565 | Lagant | May 27, 1952 |
| 2,696,972 | Howe | Dec. 14, 1954 |

OTHER REFERENCES

Canadian Mining and Metallurgical Journal, October 1955, vol. 48, pages 641, 642, "Pack Sack Drill."